United States Patent [19]
Abe

[11] Patent Number: 5,181,696
[45] Date of Patent: Jan. 26, 1993

[54] VEHICLE HEIGHT ADJUSTING DEVICE FOR ATTACHMENT TO A HYDRAULIC SHOCK ABSORBER FOR VEHICLES

[75] Inventor: Shigenobu Abe, Hamamatsu, Japan

[73] Assignee: Kabushiki Kaisha Showa Seisakusho, Tokyo, Japan

[21] Appl. No.: 568,508

[22] Filed: Aug. 16, 1990

[30] Foreign Application Priority Data

Aug. 23, 1989 [JP] Japan .................. 1-214820

[51] Int. Cl.$^5$ ............ B60G 15/12; B62K 25/04; F16F 9/06; F16F 9/50
[52] U.S. Cl. ................. 267/64.17; 267/221; 280/276; 280/710; 280/714
[58] Field of Search .......... 267/64.17, 64.16, 64.15, 267/64.18, 64.19, 64.21, 186, 187, 221, 217; 188/299, 318, 317, 298; 280/710, 714, 708, 709, 276, 724, 670, 284, 43.18; 180/219

[56] References Cited

U.S. PATENT DOCUMENTS

| | | | |
|---|---|---|---|
| 3,497,199 | 2/1970 | Tuczek ..................... | 267/64.17 |
| 3,865,135 | 2/1975 | McWilliams et al. ....... | 267/64.11 X |
| 4,170,279 | 10/1979 | Pelletier ................. | 267/64.11 X |
| 4,325,567 | 4/1982 | Hendrickson ............. | 267/64.17 X |
| 4,577,840 | 3/1986 | Meller et al. ............ | 267/64.17 |
| 4,877,223 | 10/1989 | Hackett ................... | 267/64.17 |
| 4,993,693 | 2/1991 | Löhr et al. .............. | 267/64.17 |
| 5,009,451 | 4/1991 | Hayashi et al. .......... | 267/221 X |
| 5,022,501 | 6/1991 | Hayashi et al. .......... | 267/64.12 X |
| 5,062,616 | 11/1991 | Sommer .................... | 267/64.17 |
| 5,098,120 | 3/1992 | Hayashi et al. .......... | 267/217 X |

Primary Examiner—Douglas C. Butler
Attorney, Agent, or Firm—Kane, Dalsimer, Sullivan, Kurucz, Levy, Eisele and Richard

[57] ABSTRACT

A vehicle height adjusting device for attachment to a vehicle hydraulic shock absorber having a pump chamber used for delivering the fluid under pressure by the compression and extension strokes of the shock absorber. The device includes a hydraulic jack unit arranged in series with a suspension spring and a change-over valve for selectively adjusting vehicle height to a up position or a down position. The pump chamber, jack unit and reservoir are connected through the change-over valve by the delivery line for delivering hydraulic fluid from the pump chamber to the jack unit in the up position set by the change-over valve, a line for returning hydraulic fluid from the jack unit to the reservoir in the down position of vehicle height, and a line for by-passing hydraulic fluid from the pump chamber. The device has a supply line which branches from the delivery line upstream to the change-over valve and communicates with the reservoir, a first check valve arranged in the supply line in the direction of preventing the flow of fluid from the pump chamber to the reservoir, a second check valve provided in the delivery line downstream to a branch point of the supply line in the direction of preventing the flow of fluid from the jack unit to the pump chamber, a relief line provided between the second check valve and the branch point of the supply line and communicating with the reservoir, and a relief valve provided in the relief line.

9 Claims, 8 Drawing Sheets

Up position of vehicle height

Down position of vehicle height

5,181,696

VEHICLE HEIGHT ADJUSTING DEVICE FOR ATTACHMENT TO A HYDRAULIC SHOCK ABSORBER FOR VEHICLES

FIELD OF THE INVENTION

The invention relates to a vehicle height adjusting device for attachment to a hydraulic shock absorber for vehicles or motorcycles.

BACKGROUND OF THE INVENTION

A vehicle height adjusting device for a vehicle hydraulic shock absorber is publicly known for example from Japanese patent laid-open publication Sho-58-56985. As shown in FIG. 9, such hydraulic shock absorber for vehicles, to which the self pumping type vehicle height adjusting device is attached, is a rear cushion which comprises a cylinder 72 having at one end thereof a mounting member, a piston 73 slidably fitted in the cylinder 72, a piston rod 75 protruding from the piston and having at the free end thereof a mounting member 74, a fluid tank 76 having a reservoir D connected to a hydraulic chamber A between the piston and the cylinder, and a suspension spring 77 interposed between each of the spring bearings of the cylinder and the piston rod. The automatic vehicle height adjusting device comprises, as a hydraulic jack unit, a plunger case 78 firmly connected to the mounting member of the rear cushion and a plunger 79 slidably fitted on the outer periphery of the plunger case 78, and hydraulic jack chamber B is formed between the spring bearing at the inner end of the plunger and the plunger case. A check valve 80, which is adapted to be opened at the compression stroke of the shock absorber and closed at the extension stroke, is provided at the end of the piston rod within the cylinder, and the check valve 80 communicates with the hydraulic jack chamber B through a passage 81 provided concentrically in the piston rod 75. The cylinder 72 is provided at the bottom thereof with a further check valve 82, and the hydraulic chamber A within the cylinder is connected through the check valve 82 to a reservoir C between the cylinder 72 and the outer tube 83 and/or to a reservoir D of the fluid tank 76.

During the running of the motorcycle, a portion of the hydraulic fluid corresponding to the volume taken by the piston rod 75 which enters into the cylinder at the compression strokes of the shock absorber passes through the orifice of a compression side damping valve 82 at the bottom of the cylinder 72 and forces the disc valve adjacent to the lower surface of the damping valve 82 to be deflected, thereby allowing said portion of the hydraulic fluid to flow therethrough to the reservoir D between the cylinder 72 and the outer tube 83 and/or to the fluid tank 76 at the outside, while producing the damping force at the compression side. At the same time, another portion of the hydraulic fluid passes through a valve arranged on the upper surface of the piston 73 into the upper chamber above the piston, while producing the damping force at the compression side. Furthermore, at the compression stroke, the check valve 80 within the valve housing at the end of the piston rod 75 is kept open, so that the hydraulic fluid within the hydraulic chamber A is allowed to flow through the passage 81 into the hydraulic jack chamber B. At the extension stroke, the check valve 80 is closed. Consequently the self-pumping action is produced, so that the hydraulic fluid is introduced into the hydraulic jack chamber B at every compression strokes to push the plunger 79 upwardly to thereby increase the vehicle height.

However, this self-pumping type vehicle height adjusting device enables the vehicle height to be kept constant, but it could not satisfy a demand that when the motorcycle is running on a waste land, the vehicle height is increased to enhance the capability of running, and when the motorcycle is running on the streets, the vehicle height is decreased to facilitate the rider's leg to reach the earth.

Furthermore, the amount of the fluid corresponding to the volume taken by the piston rod which enters into the cylinder is allowed to flow from the hydraulic chamber A within the cylinder partly to the passage leading to the hydraulic jack chamber B and partly to the passage leading to the reservoir D of the fluid tank 76 through the demping valve 82. In this way, since the two passages from the compression pump chamber A are arranged in parallel, the amount of the hydraulic fluid flowing into the jack chamber B is made less by the portion returned to the reservoir, which takes longer time for the up of vehicle height. Besides, such parallel arrangement of the jack chamber and the reservoir makes difficult the setting of the damping force in the compression side damping valve mechanism, for example when the flow rate to the hydraulic jack chamber B is made greater for more quick rate in the increase in vehicle height, it is necessary to make greater the throttle of the compression side damping valve 82 or a pressure at which the valve is caused to open, but which will result in much higher damping force at the compression stroke and therefore in a harder ride. On the contrary, more soft setting of the compression side damping force will result in less amount of fluid delivered to the hydraulic jack chamber B, which requires longer time for the increase in vehicle height, and accordingly the meaning of the vehicle height adjusting device attached to the motorcycle will be lost.

Moreover, since the amount of the fluid corresponding to the volume taken by the rod which enters into the cylinder is divided into two ones as stated above, the fluid passing through the compression side damping valve is a portion thereof, and therefore the amount of the fluid which contributes to the generation of the damping force is less and the damping force at each of the compression strokes during raising of the vehicle height is not sufficient so that bottoming is easily caused.

SUMMARY OF THE INVENTION

It is an object of the invention to provide a vehicle height adjusting device for a vehicle hydrauric shock absorber by means of which the changing operation of vehicle height can be made in the neighborhood of a driver seat riding on a motorcycle according to the state of road surface as occasion demands.

It is a further object of the invention to provide a self-pumping type vehicle height adjusting device for a vehicle hydraulic shock absorber, in which the overall amount of the fluid corresponding to the volume taken by the piston rod which enters into the cylinder at the compression strokes of the hydraulic shock absorber contributes to the generation of the damping force and at the same time the overall amount of the fluid contributes to the adjustment in vehicle height.

According to one aspect of the invention, there is provided a vehicle height adjusting device for a vehicle shock absorber, comprising a change-over valve for selectively connecting the jack unit to a delivery line which communicates with a pressure source or to a return line which communicates with a reservoir in order to deliver fluid under pressure into the jack unit or discharge it from the jack unit into the reservoir, a relief line which branches from the delivery line and communicates with the reservoir, and a relief valve which is provided in the relief line and causes the pressure source to communicate with the reservoir when the hydraulic pressure of the jack unit has reached above a predetermined pressure value.

With the vehicle height adjusting device according to the invention, since the change-over valve for selectively connecting the jack unit to the delivery line which communicates with the pressure source or the return line which communicates with the reservoir can be attached in the vicinity of a driver's seat, he can easily achieve the up and down operation of vehicle height riding on a motorcar according to the state of road surface.

Furthermore, in the vehicle height adjusting device according to the invention, since the pump chamber which delivers fluid under pressure by the compression and extension strokes of the hydraulic shock absorber is used as a pressure source within the shock absorber while the relief valve is arranged in the relief line, the fluid within the pump chamber can be returned to the reservoir at the up position of vehicle height set by the change-over valve when the pressure in the jack unit has reached above a predetermined value, so that the hydraulic shock absorber automatically restores to the normal delivering and discharging action of the shock absorber with the change-over valve being set to the up position of vehicle height, which does not require any particular operations such as the setting of the charge-over valve to a neutral position, thus improving ease of operation.

Moreover, with an arrangement of a second check valve in the delivery line for delivering hydraulic fluid from the pump chamber to the jack unit at the up position of vehicle height set by the change-over valve and an arangement of a first check valve in a supply line, the overall amount of the delivered fluid from the pump chamber at the compression stroke of the hydraulic shock absorber in the up position of vehicle height set by the change-over valve is allowed to flow through the delivery line having the second check valve therein into the jack chamber of the jack unit to thereby contribute of vehicle height, and at the extension stroke, the fluid is allowed to quickly flow back from the reservoir through the sucked and opened first check valve directly into the pump chamber, thus reducing the time required for the up of vehicle height.

Besides, since a compression side damping valve is provided in the delivery line between the supply line and a branch point of the relief valve, the overall amount of fluid corresponding to the volume taken by the piston rod which enters into the cylinder is capable of contributing to the production of the damping force at the compression side, while facilitating the setting of the damping force at the compression stroke of the hydraulic shock absorber, and allowing the setting of the greater damping force.

Further, since the rotary type change-over valve is so constructed that it has passages therein which communicate with the delivery line and the return line in each of the positions of the change-over valve and which communicate with each other, and a third check valve is provided in one of the passages within the change-over valve in the direction of preventing the flow of fluid from the pump chamber to the reservoir in the up position of vehicle height and of preventing the flow of fluid from the pump chamber to the jack chamber in the down position of vehicle height, the turning opera(ion of such rotary type change-over valve having therein the third check valve permits the delivery line between the pump chamber and the jack chamber to communicate with each other while cutting off the line communicating with the reservoir in the up position of vehicle height, and permit the flow of the fluid from the pump chamber to the jack chamber to be prevented while quickly returning the fluid under pressure from the jack unit into the reservoir, thereby enabling the time required for the down of vehicle height to be reduced.

BRIEF DESCRIPTION OF THE DRAWINGS

Other objects and aspects of the invention will become apparent from the following description of embodiments with reference to the accompanying drawings in which.

DESCRIPTION OF THE PREFERRED EMBODIMENTS

Figure 1:
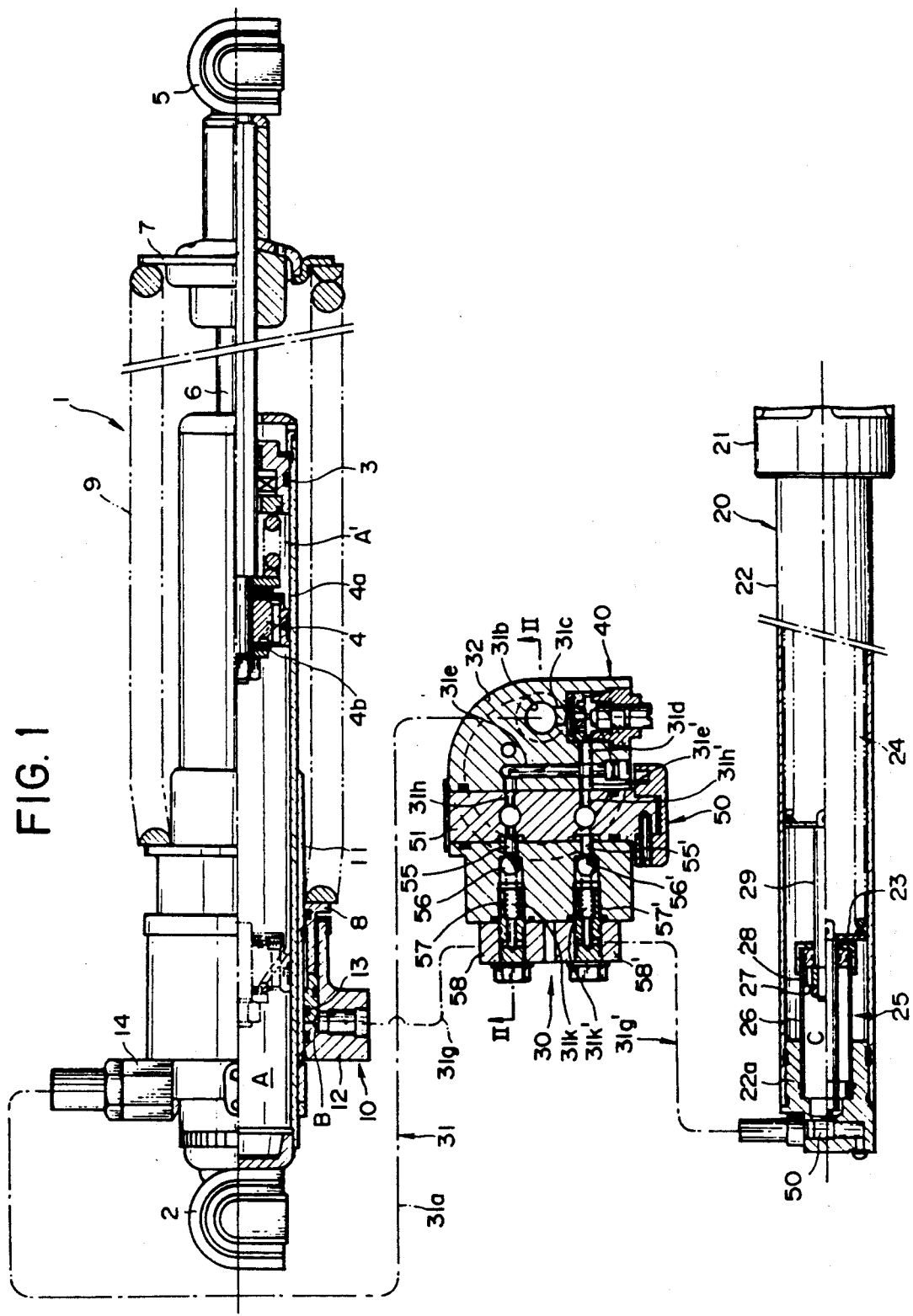
FIG. 1 is a general view of a first and a second hydraulic shock absorber provided with a self-pumping type vehicle height adjusting device according to the invention, which includes a longitudinal sectional view of a change-over valve of the vehicle height adjusting device changed to the up of vehicle height.

FIG. 1 illustrates a general view of a self-pumping type vehicle height adjusting device which permits simultaneous adjustment of a rear cushion and a front fork for a motorcycle or hydraulic shock absorbers for a vehicle.

The rear cushion 1 comprises a cylinder 3 having at one end thereof one mounting member 2 for the vehicle body, a piston 4 slidably fitted in the cylinder 3, and a piston rod 6 protruding from the piston 4 to the side opposite to the mounting member 2 and having at the free end the other mounting member 5 for an axle, and a suspension spring 9 interposed between a spring bearing 8 provided at the end of the piston rod 6 and a spring bearing 8 provided at the end of the cylinder 3.

A known jack unit 10 which forms one part of the self-pumping type vehicle height adjusting device includes a sleeve 11 secured on the outer periphery of the cylinder 3 of the rear cushion 1. A cylinder case 12 is firmly secured to the sleeve 11, a plunger 13 is slidably mounted between the inner peripheral surface of the plunger case and the outer peripheral surface of the sleeve 11, and the end of the plunger 13 is in abutting engagement with the end of the spring bearing 8 by the biasing force of the suspension spring 9. In this way, a hydraulic jack chamber B is formed between the plunger case 12 and the plunger 13.

A front fork 20 comprises an outer tube 21 at the axle side and an inner tube 22 at the vehicle body side which is slidable within the outer tube 21, and a suspension spring 24 is interposed between a spring bearing (not shown) at the upper end of a seat pipe (not shown) protruding upwardly from the bottom of the outer tube 21 and a spring bearing 23 at the upper end of the inner tube 22.

A jack unit 25 of the front fork 20 which constitutes a portion of the self-pumping type vehicle height adjusting device, comprises a plunger case 26 firmly secured to a fork bolt 22a secured to the upper end of the inner tube 22, a plunger 28 slidably fitted within the plunger case and having a through bolt 27, and a rod 29 protruding outwardly from the plunger 28. In this way, a hydraulic jack chamber C is formed between the plunger case 26 and the plunger 28. The above-mentioned spring bearing 23 is attached to the end of the rod 29.

A delivery line or passage 31 is provided to deliver the hydraulic fluid from the pump chamber A of the rear cushion 1 to the hydraulic chamber B of the jack unit 10 of the rear cushion 1. The delivery passage 31 branches at 31e' on the way and is connected to the hydraulic jack chamber C of the jack unit 25 of the front fork 20. The delivery passage 31 is provided with a self-pumping type vehicle height adjusting unit 30, which is practically arranged behind and under a driver's seat of a motorcycle and can be operated by the driver riding on the motorcycle.

Figure 3:
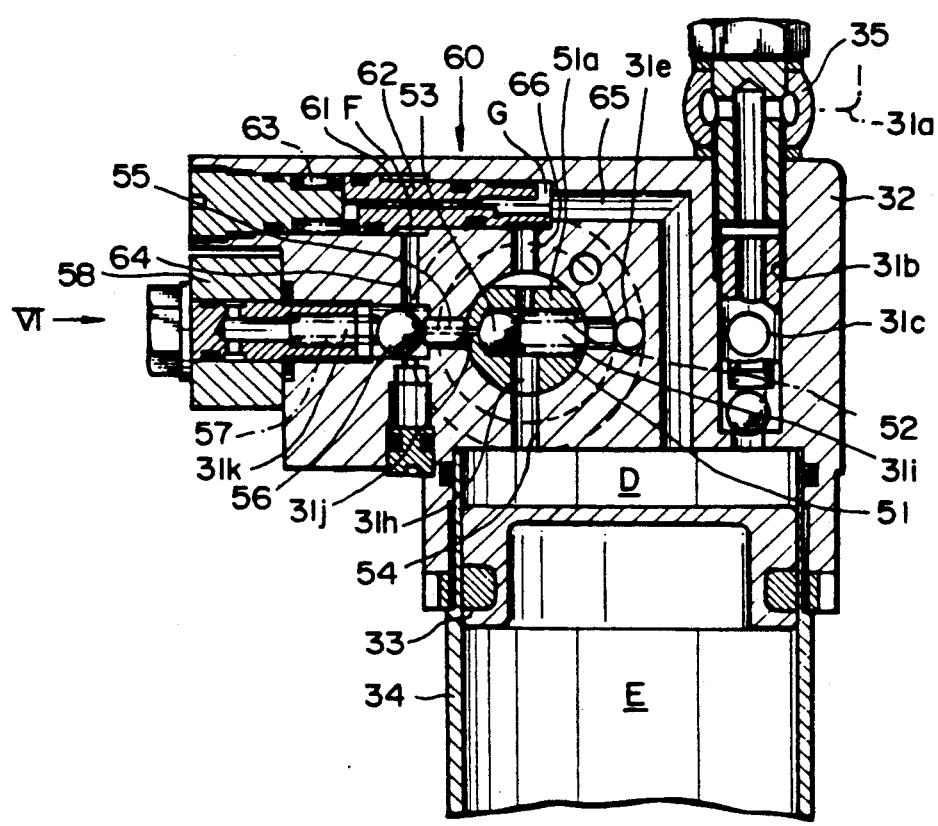
FIG. 3 is a fragmentary sectional view simillar to FIG. 2, but illustrates a state in which the change-over valve is changed to the down position of vehicle height.

As shown in FIG. 3, the body 32 of the vehicle height adjusting unit has a fluid tank 34 threadably connected thereto, and a free piston 33 is shidably fitted in the fluid tank 34. The body 32 serves as well a lid member for the fluid tank. One chamber E partitioned by the piston 33 is filled with gas and the other chamber D formes a reservoir.

A passage 31b of a pipe joint 35 connected through a passage 31a to the pump chamber within the cylinder of the rear cushion 1 leads to a lateral passage 31c, in which a compression side damping valve 40 is provided which produces the compression damping force at the compression stroke. A supply passage 36 (FIGS. 2 and 2a) which branches from passages 31b, 31c is provided with a first check valve 39 energized so as to normally close an opening to the reservoir D by a spring 38 supported on a holder 37.

Figure 4:
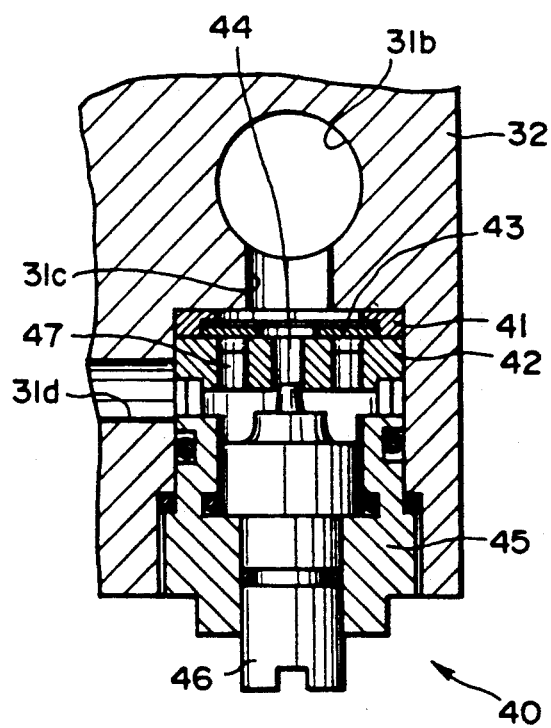
FIG. 4 is a fragmentary sectional view illustrating a compression side damping valve of a self-pumping type vehicle height adjusting device in FIG. 1.

In the above-mentioned compression side damping valve 40 as shown in FIG. 4, a ring-like check valve 43 is arranged between a spacer 41 and a bottom piece 42, and the front end of a needle valve 46 threadably connected for adjustment from the outside to a holder 45 screwed into the body 32 is close to the center hole 44 of the bottom piece 42 to thereby form a throtted passage. A plurality of through holes 47 are provided around the center hole 44 of the bottom piece 42 and the check valve 43 is arranged so that it allows to open the through-holes 47 at the extension stroke.

Figure 2:
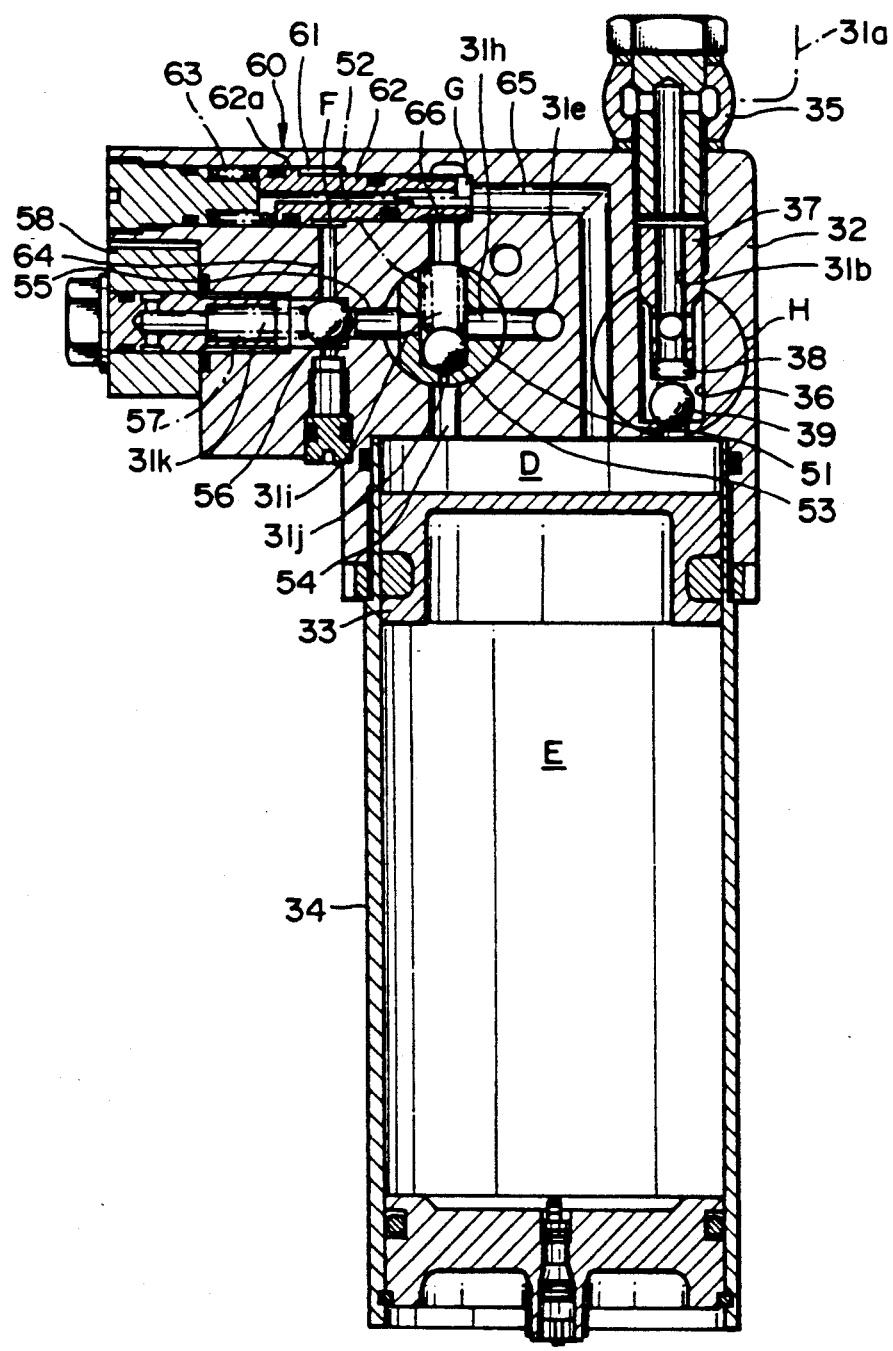
FIG. 2 is a fragmentary sectional view of the vehicle height adjusting device taken along the line II—II of FIG. 1.
Figure 2A:
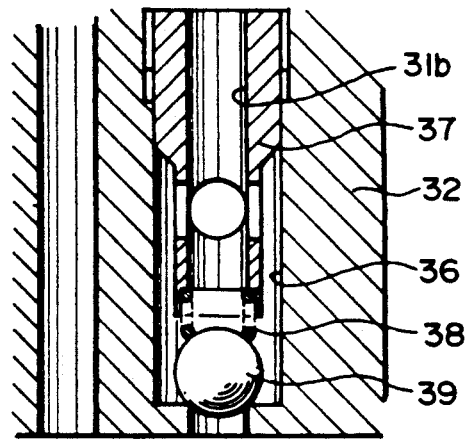
FIG. 2a is an enlarged view of a portion within a circle H in FIG. 2.
Figure 2B:
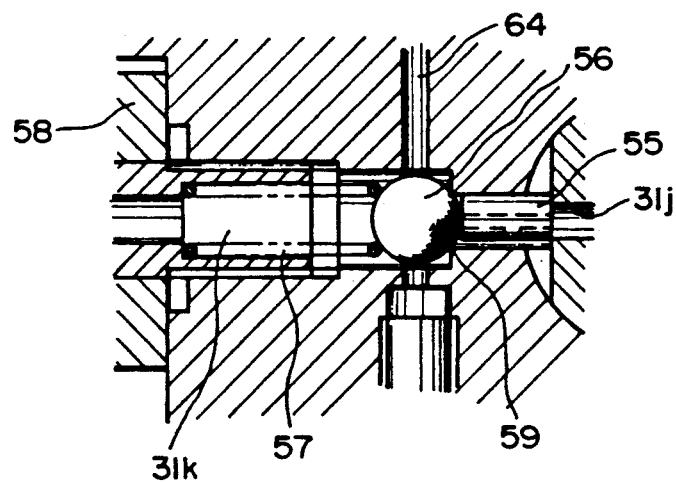
FIG. 2b is an enlarged view illustrating a region of a change-over valve, a tappet and a second check valve.
Figure 5:
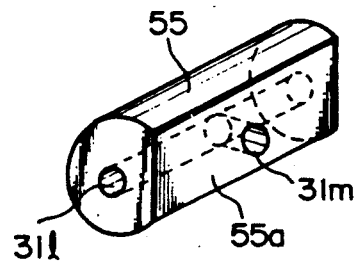
FIG. 5 is a perspective view of the tappet adjacent to the change-over valve of the vehicle height adjusting device.

A delivery passage 31d leading downstream from the compression side damping valve 40 branches into two passages, one a passage 31e leading to the hydraulic jack chamber B of the rear cushion 1 and the other a passage 31e' leading to the hydraulic jack chamber C of the front fork 20. These passages are provided with a common rotary type change-over valve 50. The change-over valve 50 has a rotatable body 51, which has two passages 31h and 31i (FIG. 2 or FIG. 3) intersecting at right angles and communicating at their one side with the passage 31e and 31e', respectively. Since the arrangement of the passages 31h, 31i and 31h', 31i' of the change-over valve in the respective lines leading to the respective hydraulic jack chambers B and C of the rear cushion and the front fork are the same, only one of them will be explained. The body 51 of the change-over valve shown in FIGS. 1 and 2 is in the up position of vehicle height, and the body 51 shown in FIG. 3 is in the down position of vehicle height. The body 51 of the change-over valve is inserted into a bore in the body 32 so that it takes two positions consisting of the up and down positions of vehicle height by turning operation of the body through 90 degree in one direction and the reverse direction. When the valve body 51 is in the up position of vehicle height (FIGS. 1 and 2), the change-over valve is set such that among the ports at both ends of the intersecting passages 31 provided within the valve body 51, one port formed on the circumferential face of the valve body 51 is directed to the upstream sides 31e, 31e' of the delivery line 31, and the other port on the flat surface formed by partially cutting off the periphery of the valve body 51 is directed to the downstream side 31k, 31k' of the delivery passage 31. When the valve body 51 is in the down position of vehicle height (FIG. 3), it is set so that one port on the peripheral surface of the delivery passage 31h is directed to a passage 54 which is a return passage leading to the reservoir D and the other port on the flat surface is directed to a relief line or passage 66. In another passage 31i intersecting at right angles within the valve body 51, an orifice 31j is formed at one of the ports and normally closed by a third check valve 53 energized by a spring 52. When the change-over valve is set to the up position (FIGS. 1 and 2) of vehicle height, the passage 31i is positioned so that the orifice 31j is directed to a passage 54 communicating with the reservoir D and a port opposite to the orifice 31j is directed to a relief passage 66. When set to the down position (FIG. 3) of vehicle height, the orifice 31j is directed to the downstream sides 31u, 31k' of the delivery line 31 and the port opposite to the orifice is directed to the upstream sides 31e, 31e'. A valve seat 59 (FIG. 2b) is formed on the stepped portion at the downstream side of a cylindrical bore of smaller diameter in passages 31u, 31u' downstream to the delivery line 31, and a second check valve 56 is pressed against the valve seat 59 by a spring 57. The cylindrical bore of smaller diameter has a cylindrical tappet 55 slidably fitted therein which is at one end thereof in sliding engagement with the outer periphery of the valve body 51 and at the other end adapted to close and open the second check valve 56. As apparent from FIG. 5, the tappet 55 has a passage 31$l$ drilled through along the center axis and a branched passage 31$m$ which intersects at right angles with the passage 31$l$ and opens at a flat surface of the tappet 55. Furthermore, the passage 31$k$ is connected from the pipe joint 58 through a line 31$g$ (FIG. 1) to the hydraulic jack chamber B. Similarly, another passage 31$e'$ which branches from the line 31$d$ downstream to the compression side damping valve 40 is connected via the change-over valve 50, a pipe joint 58' and a line 31$g'$ to the hydraulic chamber C of the front fork 20. In this way, according to the invention, the compression side damping valve 40 and the change-over valve 50 for adjustment in vehicle height are arranged in series.

Each relief valve 60 (FIG. 2 or FIG. 3) is provided in a by-pass passage from the delivery line which connects the jack units of the rear cushion 1 and the front fork 20 to the pump chamber A of the rear cushion 1, in order to make the pump chamber A communicate with the reservoir D of the fluid tank 34 when the inner-pressure in the respective hydraulic jack chambers B and C of the jack units 10 and 25 has reached above a predetermined value in the up position of vehicle height. That is, the relief valve 60 comprises a valve body 62 slidably fitted in a bore 61 provided in the body 32, and a spring 63 for biasing the valve body 62 toward the reservoir D of the fluid tank 34. The bore 61 has a greater diameter portion at one end thereof and a smaller diameter portion at the opposite end facing a passage 65 formed in the body 32, and a stepped portion is formed adjacent to the passage 65 and provides a valve seat, with which the front end of the valve body 62 is in abutting engagement. The valve body 62 normally cuts off the communication of the relief passage 66 formed in the body 32 with the above-mentioned passage 65 by the biasing force of a spring 63. Further, the valve body 62 has a smaller diameter portion, a greater diameter portion and a flange portion which are formed in order from the front end side, and is energized toward the valve seat within the bore 61 by a spring 63. A fluid chamber F which opens in a pilot passage 64 of the body 32 leading to the jack chambers is formed between the greater diameter portion of the bore 61 and the smaller diameter portion of the valve body 62.

Figure 6:
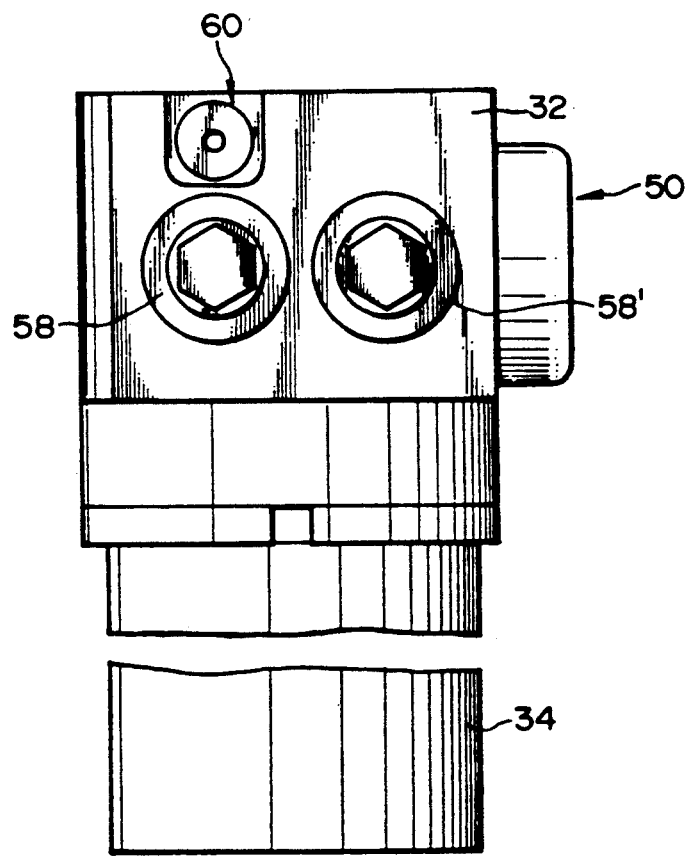
FIG. 6 is an end view as viewed from an arrow mark VI in FIG. 3.
Figure 7:
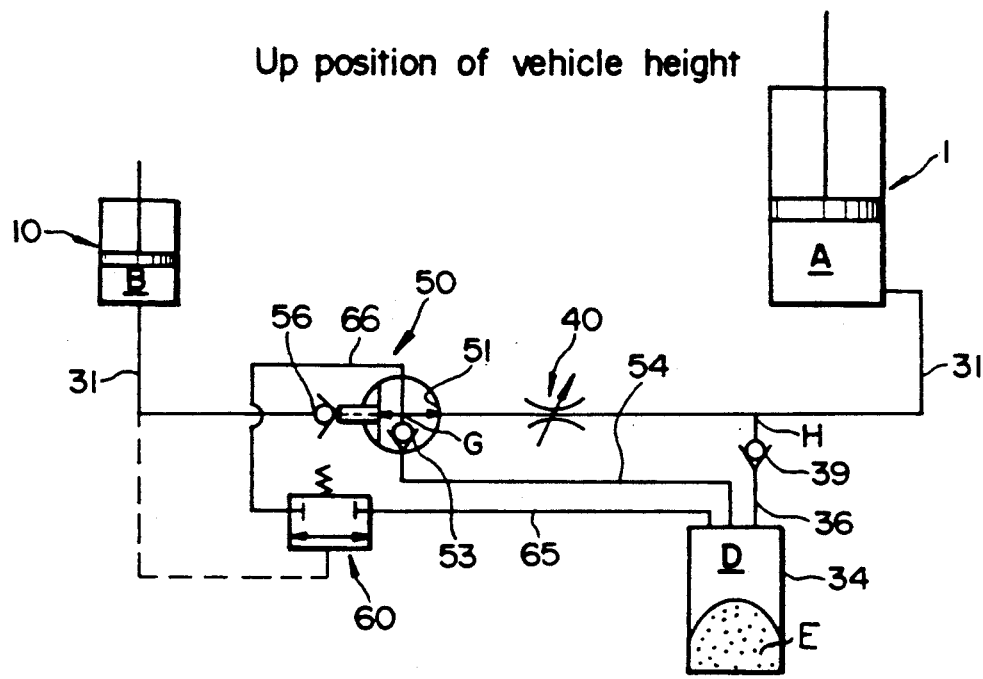
FIG. 7 is a hydraulic circuit diagram for the hydraulic shock absorber provided with the vehicle height adjusting device according to the invention, and illustrates a state in which the change-over valve is changed to the down position of vehicle height.
Figure 8:
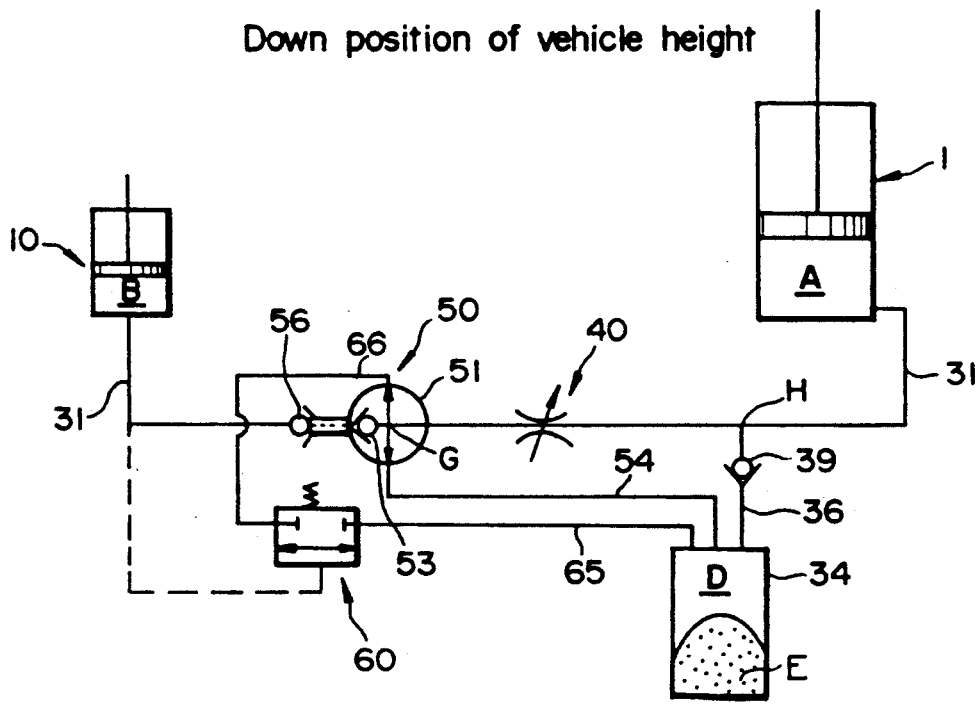
FIG. 8 is a hydraulic circuit diagram similar to FIG. 7 but in a state in which the change-over valve is set to the down position of vehicle height.
Figure 9:
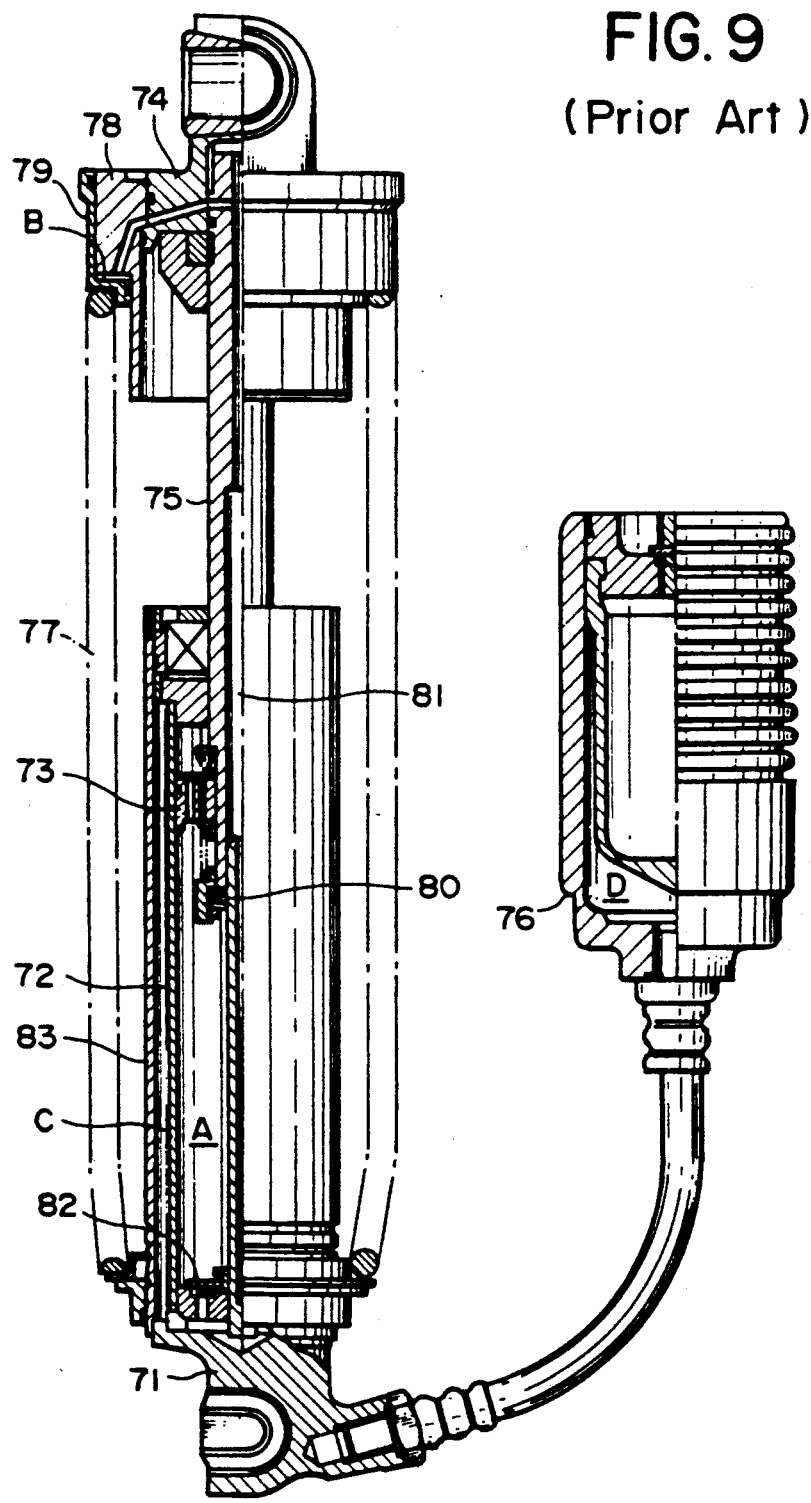
FIG. 9 is a longitudinal sectional view of a hydraulic shock absorber having a conventional self-pumping type vehicle height adjusting device.

FIG. 6 is a side view as viewed from the arrow mark V1 in FIG. 3 and shows the external appearance of the vehicle height adjusting unit in which one can see the pipe joints 58, 58' for connecting the vehicle height adjusting unit to the rear cushion and the front fork, respectively, and The arrangement of the self-pumping type vehicle height adjusting device for a hydraulic shock absorber as stated above is shown in FIGS. 7 and 8 by hydraulic circuit diagrams. FIG. 7 shows a circuit diagram in which the change-over valve is set to the up position of vehicle height and FIG. 8 shows a circuit diagram in which the change-over valve is set to the down position of vehicle height.

From these circuit diagrams it is understood that the pump chamber A, the jack unit 10 and the reservoir D are connected through the change-over valve 50 by the line 31 for delivering hydraulic fluid from the pump chamber A to the jack unit 10 at the up position of vehicle height (FIG. 7), the line for returning hydraulic fluid from the jack unit 10 to the reservoir D at the down position of vehicle height (FIG. 8) (line 31—branch point G—line 54) and the line for by-passing hydraulic fluid from the pump chamber A to the reservoir D (line 31—branch point G—line 54). It is moreover understood that the supply line 36 is formed which branches at a branch point H from the line 31 upstream to the change-over valve 50 and communicates with the reservoir D, the first check valve 39 being arranged in the supply line 36, the second check valve 56 being arranged in the delivery line 31 downstream to the branch point H of the supply line 36, the relief lines 66, 65 leading to the reservoir D being provided between the second check valve 56 and the branch point H of the supply line 36, and the relief valve 60 being arranged in the relief lines 66, 65.

In operation, in running a motorcycle provided with the self-pumping type vehicle height adjusting device of the invention on the plane streets, the valve body 51 is set to the down position of vehicle height in FIG. 3 or FIG. 8 by a rider. During the running of the motorcycle, the piston 4 moves in reciprocating motion within the cylinder 3, and at the compression stroke of the rear cushion 1, the fluid passes through a hole of the piston 4 from the pump chamber A and pushes up a valve 4$a$ to allow the fluid to flow into the fluid chamber at the opposite side, the flow resistance of which produces the compression side damping force. At the same time, since the first check valve 39 (FIG. 2) of the supply passage 36 is closed, the fluid in the pump chamber A by the amount which corresponds to the volume taken by the piston rod which enters into the cylinder, is allowed to flow into the compression side damping valve 40 from the passage 44 (FIG. 4) via the delivery line 31$a$, 31$b$, 31$c$, so that the passage throttled between the needle valve 46 and the passage 44 produces the compression side damping force. The fluid, which passes out of the compression side damping valve 40, branches into 31$e$ and 31$e'$ from the passage 31$d$ and passes two parallel passages 31$i$, 31$i'$ (FIG. 3, but 31$i'$ is not shown) of the valve body 51 of the change-over valve 50, respectively, but the third check valves 53, 53' (53' is not shown) closes the line toward the jack unit, so that the fluid is forced to flow into the reservoir D of the fluid tank 34 through the passages 54, 54' (54' is not shown) which provides a by-pass line. The gas chamber E Performs the compensation of change in volume accompanied by the forward and backward movement of the piston rod within the cylinder. At the extension stroke of the rear cushion 1, the fluid within the pump chamber A passes through an inclined hole of the piston 4 and pushes up the valve 4$b$ to allow the fluid to flow into the pump chamber A, the flow resistance of which produces the extension side damping force. The fluid corresponding to the volume taken by the piston rod which is pulled out of the cylinder is allowed to flow from the reservoir D of the fluid tank 34 through the first check valve 39 (FIG. 2) opened due to the decrease in pressure within the pump chamber A, and further through the supply passage 36, the passage 31$b$, the pipe joint 35 and the passage 31$a$ into the pump chamber A of the rear cushion 1, thus performing direct and quick supplement of the fluid. Moreover, the check valve 43 which closes the through hole 47 of the bottom piece 42 of the compression side damping valve 40 is caused to open so that the oil is returned also from here into the pump chamber A within the cylinder.

As the motorcycle enters into running on a waste land, the change-over valve 51 is set to the up position of vehicle height as shown in FIGS. 1 or 2, and at the compression stroke of the rear cushion 1, the fluid corresponding to the volume taken by the piston rod which enters into the cylinder, is allowed to flow from the pump chamber A through the delivery passages 31a, 31b, 31c into the compression side damping valve 40, in which the fluid is throttled by the needle valve 46 to thereby produce the compression side damping force, and then the fluid flows from the passage 31d into two branched passages 31e and 31e' and passes through two opened parallel passages 31h, 31h' in the valve body 51 and then through the center passage 31l of the tappets 55, 55' and forces the second check valves 56, 56' to be opened against the biasing force of the springs 57, 57' to thereby allow the fluid to flow through the passage 31k, then passing through 31g and 31g' into the hydraulic jack chamber B of the rear cushion 1 and the hydraulic jack chamber C of the front fork 20. At the extension stroke of the rear cushion 1, decrease in pressure within the pump chamber A causes the second check valve 56 in the sucked and close the valve seat at the opposite side, so that the fluid in the jack units of the rear cushion 1 and the front fork 20 is not allowed to flow in the reverse direction, but decrease in pressure within the chamber A causes the first check-valve 39 to be opened, whereby the fluid within the reservoir D of the fluid tank 34 is sucked directly through the supply line 36, the passages 31b, 31a into the pump chamber A of the rear cushion 1 to thereby quickly compensate the amount of the fluid corresponding to the volume taken by the piston rod which is pulled out of the cylinder. Such repeated compression and extension strokes of the rear cushion 1 performes self-pumping action through the operation of the second check valves 56, 56', and at every compression strokes of the rear cushion 1 the fluid is introduced into the respective jack chambers B and C of the rear cushion 1 and the front fork 20, thereby causing the respective springs 9 and 24 to be gradually compressed. When the pressure within the jack chambers B and C exceeds a predetermined value, the fluid under pressure acts on the fluid chamber F through the pilot passage 64 and pushes the valve body 62 of the relief valve 60 against the spring 63 to the left as viewed in FIG. 2, to thereby move the end of the valve body 62 away from the valve seat 62b, so that the fluid within the pump chamber A of the rear cushion 1 is returned to the reservoir D of the fluid tank 34 from the relief passage 66 through the passage 65.

In this way, the suspension springs 9 and 24 are gradually compressed, but since the vehicle body is balanced by the suspension springs 9 and 24, the respective plungers 13 and 28 compress the suspension springs 9 and 24 to thereby increase the load of the suspension springs, so that the vehicle body is pushed up and increase in vehicle height is achieved.

When the motorcycle enters from the running on a waste land to that on a plane street, the change-over valve 51 is turned to the down position of vehicle height as shown in FIG. 3, the tappet 55 is raised upwardly by the outer periphery of the valve body 51 to thereby remove the second check valves 56, 56' away from the valve seat 59. As a result, the fluid under pressure within the hydraulic jack chambers B and C of the rear cushion 1 and the front fork 20 is allowed to flow through the second check valves 56, 56' which has been opened, and then it passes from the passage defined by the plane surface 55a of the respective axial peripheries of the tappets 55, 55' and by the inner peripheral surface of the cylindrical bore of small diameter, through the radial passage 31 drilled in the tappet and the axial bore 31l, and then passes through the orifice 31j of the valve body 51 and forces the third check valves 53, 53' to be opened against the springs 52, 52', thus allowing the fluid to flow from the delivery passage 31h of the change-over valve through the passage 54 of the body 31 as a return line into the reservoir D. This extracts the fluid within the jack chambers B and C of the rear cushion 1 and the front fork 20, so that the plungers 13 and 28 are moved back within the respective plunger cases and accordingly decrease in vehicle height is brought about.

What is claimed is:

1. A vehicle height adjusting device for a shock absorber of a vehicle, said shock absorber extending between an axle and a body portion of said vehicle, said device including:
   a hydraulic jack unit attached to one of a body side and axle side of said shock absorber, a distance between the vehicle body and the axle being adjustable by a delivery of a fluid under pressure into said jack unit;
   a fluid reservoir;
   a source of fluid under pressure including a pump chamber formed within said shock absorber wherein compression and extension strokes of said shock absorber deliver fluid under pressure from said pump chamber;
   a delivery line extending between said source of fluid under pressure and said jack unit through which said fluid under pressure is delivered to said jack units;
   a return line extending between said reservoir and said jack unit through which fluid is discharged from said jack unit;
   a change-over valve for selectively connecting one of said delivery line and said return line with said jack unit;
   a relief line branching from said delivery line and communicating with said fluid reservoir; and
   a relief valve including means for detecting when said change-over valve is set to a position for fluid to be delivered to said jack unit and means for detecting of the pressure within said jack unit has reached a predetermined level, said relief valve being provided in said relief line for bringing said source of fluid under pressure into communication with said reservoir when the fluid within said jack unit reaches said predetermined pressure level.

2. A vehicle height adjusting device as set forth in claim 1, wherein said change-over valve is a rotary type valve.

3. A vehicle height adjusting device as set forth in claim 2, wherein said delivery line, return line and relief line intersect at right angles around the rotary valve, and passages which open into each of said aforementioned lines are formed in said rotary valve communicating with each other.

4. A vehicle height adjusting device as set forth in claim 1, wherein said relief valve has a plunger type valve body having a flange portion, said valve body being biased to close said relief line by a spring and having the flange portion at a periphery which communicates with a passage for fluid under pressure from the hydraulic jack unit, whereby said relief valve body opens the relief line when the pressure level has reached above a predetermined pressure level.

5. A vehicle height adjusting device for a shock absorber of a vehicle, said shock absorber extending between an axle and a body portion of said vehicle, said device comprising:

a pump chamber disposed in said shock absorber with a piston rod slidably fitted within said chamber for delivering fluid under pressure to a hydraulic jack unit from the pump chamber in response to compressions and extensions of said shock absorber;

a fluid reservoir;

a hydraulic jack unit provided on a member attached to one of a body side and axle side of said shock absorber, a distance between the vehicle body and the axle being adjustable by the delivery of a fluid under pressure into said hydraulic jack unit from said pump chamber and discharging fluid from said jack unit into said reservoir;

a change-over valve interconnecting said pump chamber, jack unit and reservoir;

a delivery line extending between said pump chamber and said jack unit through which fluid is delivered to said jack unit in response to said change-over valve being set in a vehicle up position;

a return line extending between said reservoir and said jack unit through which fluid is discharged from said jack unit in response to said change-over valve being set in a vehicle down position;

a by-pass line extending between said pump chamber and said reservoir;

a supply line branching from the delivery line upstream of said change-over valve communicating with said reservoir;

a first check valve provided in said supply line for preventing a flow of fluid from said pump chamber to said reservoir;

a second check valve provided in said delivery line downstream of a branchpoint of said supply line to prevent the flow of fluid from the jack unit to the pump chamber;

a relief line provided between said second check valve and said branchpoint and communicating with said reservoir; and a relief valve in said relief line openable by hydraulic pressure downstream of said second check valve when the change-over valve is set in a vehicle up position.

6. A vehicle height adjusting device as set forth in claim 5, wherein a compression side damping valve is provided in the delivery line between said branchpoint of said supply line and a branchpoint of said relief valve.

7. A vehicle height adjusting device for a shock absorber of a vehicle, said shock absorber extending between an axle and a body portion of said vehicle, said shock absorber having a pump chamber disposed therein with a piston rod slidably fitted within said chamber for delivering a fluid under pressure from the pump in response to compressions and extensions of said shock absorber, said device including: a fluid reservoir;

a hydraulic jack unit provided on a member attached to one of a body side and axle side of said shock absorber, a distance between the vehicle body and the axle being adjustable by a delivery of said fluid under pressure into said jack unit from said pump chamber and discharging fluid from said jack unit into said reservoir;

a supply line connecting said pump chamber and said jack unit, said line having a branchpoint;

a branch line extending between said branchpoint and said reservoir;

a rotary change-over valve disposed in said branch line, said change-over valve having a plurality of passages therein which communicate with said supply line and branch line at preset vehicle down and vehicle up positions of said change-over valve;

a first check valve provided in said supply line for preventing a flow of fluid from said pump chamber to said reservoir;

a second check valve provided between said change-over valve and said jack unit, said second check valve, when closed preventing a flow of fluid from said jack unit to said pump and opening in response to an operation of the change-over valve when the valve is in a vehicle down position;

a relief line provided between said second check valve and said branchpoint and communicating with said reservoir; and a relief valve in said relief line openable by hydraulic pressure downstream of said second check valve when the change-over valve is set in a vehicle up position.

8. A vehicle height adjusting device as set forth in claim 7, wherein said change-over valve is formed at an outer periphery thereof with a cam surface, and a tappet having a passage formed therein is provided between an outer periphery of the change-over valve and said second check valve, said second check valve being caused to be opened in connection with an operation of turning the change-over valve.

9. A vehicle height adjusting device as set forth in claim 7, wherein a compression side damping valve is provided in a line between the branch point of said supply line and a branchpoint of said relief valve.

* * * * *